3,746,680
PLASTER OF PARIS COMPOSITION
Joseph Boricheski, South River, N.J., assignor to
Johnson & Johnson
No Drawing. Filed Mar. 3, 1971, Ser. No. 120,749
Int. Cl. A61f *13/04*
U.S. Cl. 260—29.2 EP                  22 Claims

ABSTRACT OF THE DISCLOSURE

A settable composition and a cast-forming material comprising the composition bonded to a flexible carrier are provided for making orthopedic casts. The composition and the material, when wetted, exhibit a smooth and creamy texture, and an orthopedic cast, formed by applying the material, exhibits high "green strength" (as measured one hour after cast application). The settable compostion comprises plaster of Paris and a thermoplastic, water-soluble resin or a mixture of resins of extremely high molecular weight and high degree of crystallinity and preferably resinous mixtures of poly(ethylene oxide) having average molecular weights ranging from about 100,000 to about 4,000,000.

BACKGROUND OF THE INVENTION

The present invention relates to settable compositions and materials for forming casts used for immobilizing or supporting parts of the body. More specifically, the present invention is directed to plaster of Paris-containing compositions and materials which upon wetting are sufficiently creamy and plastic to be molded; which, when applied to patients as orthopedic casts, are strong enough to permit early ambulation; and which thereafter dry to smooth, strong, aesthetically pleasing casts.

Numerous cast-forming materials are already available comprising a settable composition of plaster of Paris (calcium hemihydrate) bonded, with the aid of adhesives or by self-adhesion, to a flexible carrier such as fabric, paper and the like. Often, such material is in strip form and wound into a roll, but it may be in square, rectangular, or other suitable pre-cut shapes. In use, the material is immersed in water, withdrawn and squeezed to remove excess water and then applied to the body in spiral fashion until enough thickness has been built up to provide, on drying, the cast strength needed.

In using cast-forming material employing plaster of Paris per se as the settable composition, orthopedists have been dissatisfied with the strength of the casts formed, particularly in the early drying stages. Such insufficient early strengths have required patients to remain relatively motionless for a substantial length of time before the cast has attained sufficient strength to permit ambulation. Further, it has been found that such material, when wetted, does not exhibit a sufficiently smooth and creamy texture so as to be readily moldable nor a sufficiently viscid consistency to overspread the carrier so that it is not felt during application of the cast.

Improvements have been made such as, for example, the addition of melamine formaldehyde resin to the settable composition, which substantially increases the ultimate strength of the cast as well as the strength twenty-four hours after application. Notwithstanding such increased strength after twenty-four hours, the improved prior cast-forming materials have not resulted in any substantial increase in the cast green strength, viz., the cast strength after one hour.

Efforts have also been directed toward improving the texture of the wetted material when applied. The settable composition has been combined with substances swellable in water such as cellulose derivatives (e.g., methyl cellulose), so as to impart a satisfactory creaminess and texture. In the main, however, such prior art compositions, while improving texture, did so only with the concomitant sacrifice of green strength in the cast.

SUMMARY OF THE INVENTION

In accordance with this invention, a settable composition and a cast-forming material comprising a flexible carrier containing the settable composition are provided which, when wetted, exhibit a smooth and creamy texture. When the material of this invention is applied as an orthopedic cast, a cast having high green strength results.

Specifically, the characteristics of both smooth and creamy texture and high green strength are obtained by providing a settable composition comprising plaster of Paris and a thermoplastic, water-soluble resin or mixtures of resins of extremely high molecular weight and high degree of crystallinity. As used hereinafter, the term "resin" includes resin compounds or mixtures of resin compounds having a particular "weight average molecular weight." "Weight average molecular weight" is defined by the relationship:

$$[n] = 1.25 \times 10^{-4} \, M_W^{0.78}$$

where $[n]$ is the intrinsic viscosity of a water solution of the resin or mixture of resins, measured at 30° C. and $M_W$ is the weight average molecular weight.

The cast-forming material of this invention is provided preferably by bonding the resin-containing settable composition to a suitable flexible carrier such as gauze, other loosely woven or non-woven fabric, or paper either by use of adhesives or by self-adhesion.

The cast-forming materials of this invention, having the characteristics of desired texture and high green strength are prepared by making a paste or slurry of a dispersing liquid, plaster of Paris, the resin and such additives as may be desired, applying the paste or slurry to a flexible carrier and thereafter heating the wetted carrier to soften the resin and drive off the dispersing liquid. While organic liquids such as alcohols, aromatic hydrocarbons or chlorinated hydrocarbons may be used as the dispersing liquids, it is preferable to use water because of its availability, ease of handling and inexpensiveness. In the preferred practice of the invention, the resin is preferably poly(ethylene oxide) and the following detailed disclosure and description will be presented in terms of this specific resin.

DETAILED DESCRIPTION OF THE PREFERRED EMBODIMENTS

The resin used in the present invention has a weight average molecular weight (hereinafter "molecular weight") of about 100,000 to about 4,000,000, and preferably is one of several mixtures of poly(ethylene oxide) resins sold commercially by Union Carbide Corporation under the trademark "Polyox." While there are poly(ethylene oxide) materials available on the market under the name Polyox which have molecular weights above and below the indicated limits, these are not suitable for use in accordance with the present invention. The poly(ethylene oxide) materials useful in accordance with the present invention are thermoplastic, water soluble and highly crystalline in nature, the percentage of crystallinity at room temperature varying widely from about 50% up to about 95% and even higher. The preferred poly(ethylene oxide) materials are those having the highest percentages of crystallinity.

Typical properties of the crystalline poly(ethylene oxide) resins of this invention are given in the following Table I.

TABLE I

Approximate
molecular weights _____ 100,000 to 4,000,000.
Melting point _____ 65±2° C.
Specific gravity _____ 1.21 g./cu.cm.
Bulk density _____ 17 to 33 lb./cu.ft.
Particle size _____ 98% through 10 mesh.
Heat of fusion _____ 33 cal./g.
Percent crystallinity _____ Between about 50% and 95%.

The plaster of Paris used for the purposes of the present invention may be ordinary plaster of Paris of the type conventionally incorporated in plaster of Paris bandages or the high strength type plaster of Paris commonly known as "alpha gypsum," described in U.S. Pat. No. 1,901,051.

The poly(ethylene oxide) resin and the plaster of Paris are incorporated into a paste or slurry employing a suitable dispersing liquid, in proportions of about 30 to about 85 parts by weight of liquid per 100 parts by weight of the plaster of Paris, preferably water in proportions of about 30 to about 60 parts per 100 parts by weight of plaster of Paris. The resin is present in the proportions of about 0.1 to about 5 parts by weight of resin to 100 parts by weight of plaster of Paris.

The poly(ethylene oxide) resin is first dissolved into the dispersing liquid at a temperature which may vary from room temperature to about the boiling temperature of the liquid. When the dispersing liquid is water, the resin is preferably first dispersed in the water at about its boiling point. Then, colder water is added to complete the dissolution of the resin, this preferably taking place at a temperature of about 20° C. to about 50° C. Alternatively, the resin may be dissolved in an initially colder solvent by providing mechanical agitation. The plaster of Paris is then combined with the resin-water solution to form a slurry.

Additives such as adhesives and retarders may be introduced into the slurry, the plaster of Paris, the resin solution, or directly onto the carrier. Both wet and dry adhesives may be added to prevent loss of the plaster of Paris composition, either while the cast-forming material is still in the dry state or after it has been immersed in water. Suitable adhesives are, for example, water-insoluble polymers and copolymers of vinyl acetate and methacrylate or acrylate esters; water-insoluble cellulosic ethers and esters; natural resins and those derivatives of resins which are water insoluble; and solubilized dextrin or starch.

When water is employed as the dispersing liquid, measures must be taken to prevent the premature hydration of the plaster of Paris. This can be accomplished by adding a plaster of Paris hydration retarder. Examples of such retarders are ammonium borate and acetic acid. A preferred retarder is a mixture of boric acid and ammonium hydroxide, since a borate complex is formed thereby which may be decomposed and volatilized during the later drying process.

If volatile additives are added, it is desired to control temperature to avoid significant loss of such additives by volatilization. For example, when ammonium hydroxide is used the slurrying step should be carried out at temperatures above about 40° C. to prevent premature volatilization of the additive.

The plaster of Paris-resin slurry, with or without additives, is applied to a flexible carrier, preferably a porous, flexible material such as, for example, gauze, crinoline, nonwoven fabrics, paper and the like. When gauze is used, the preferred type is boiled and bleached surgical gauze having a count of 32 by 28 threads per square inch. The carrier and the applied slurry thereon are then dried, preferably in either electric or gas-heated circulating air ovens, at temperatures ranging from 100 to 300° C. Preferably, the drying occurs at 150 to 250° C., a specific drying temperature being dependent upon such factors as the dryer dwell time, the particular type of drying equipment used, and the volumetric flow rate in the case of circulating air ovens.

In accordance with this invention, it has been discovered that plaster of Paris compositions containing thermoplastic, water-soluble poly(ethylene oxide) resin having molecular weights of from about 100,000 to about 4,000,000 and a high degree of crystallinity, in proportions of about 0.1 to about 5 parts by weight of resin per 100 parts of plaster of Paris will produce cast-forming materials which, in addition to being satisfactorily thick and plastic, exhibits surprisingly high green strength. Preferably, the resin is used in the proportions of about 0.1 to about 3 parts by weight per 100 parts of plaster of Paris. When the weight percent of the resin increases substantially beyond the prescribed maximum of about 5% based on the weight of the plaster of Paris, a decrease in cast green strength is noted, although satisfactory consistency and texture of the cast-forming material is maintained.

When the weight percent of resin is substantially less than the aforesaid lower limit of about 0.1% based on the weight of the plaster of Paris, the composition when wetted exhibits an intolerably thin consistency and the texture is such that when applied to a gauze carrier and dried the feel of the gauze is evidenced.

Within the suitable molecular weight range of from about 100,000 to about 4,000,000, it has been found that the use of small quantities of resin having high molecular weight will produce casts having green strengths equivalent to those obtained by using large quantities of low molecular weight resin. For example, when using resins having molecular weights in the range of about 600,000 to about 4,000,000, the highest green strengths are obtained when about 0.1 to about 1 part by weight of poly(ethylene oxide) resin per 100 parts by weight of plaster of Paris are used in contrast to a range of proportions of from 0.5 to 1.5 parts by weight of resin for similar results when a resin having an average molecular weight of 100,000 is used. When a poly(ethylene oxide) resin having a molecular weight of about 4,000,000 is utilized, the desired properties of green strength, texture and consistency are most enhanced when the resin is present in proportions of about 0.1 to about 0.25 part by weight per 100 parts of plaster of Paris. Accordingly, while green strength is increased by using the resin within the full herein-prescribed molecular weight range of 100,000 to 4,000,000, practical considerations such as ease of handling and economics indicate that the use of the high molecular weights, in the low preferred quantities, is more desirable.

The poly(ethylene oxide) resin and the plaster of Paris of the settable orthopedic cast composition material of the present invention interact after orthopedic application to produce a material having a high green strength as hereinabove defined. While it is not desired to be bound by any particular theory, it is believed that as the plaster of Paris hydrates, gypsum crystals are formed which interlock with the crystals of the poly(ethylene oxide) resin. This interlocking, mechanical in nature, apparently contributes to the high green strength of the composition of this invention.

During the drying stage, in the production of the cast-forming material of this invention, the impregnated carrier is heated to drive off the slurry dispersing liquid and dry the settable composition onto the carrier. The poly(ethylene oxide) resin component of the composition of the invention, on heating, becomes plastic and diffuses thoroughly through the drying plaster of Paris and forms an intimate network of resin film surrounding the plaster of Paris. This intimate integration of the film and the plaster of Paris further contributes to the green strength of the later formed cast.

To further illustrate the methods and advantages of the present invention, the following examples are provided.

EXAMPLE 1

A conventional plaster of Paris composition is prepared by first preparing a plaster slurry of the following components:

| Component | Composition, parts by wt. | Function |
|---|---|---|
| Boric acid | 0.4 | Hydration retarder. |
| Ammonium hydroxide (28% ammonium). | 0.8 | |
| Emulsion containing polyvinyl acetate (55% polyvinyl acetate). | 1.5 | Wet adhesive. |
| Corn dextrin | 1.5 | Dry stiffening agent, dry adhesive. |
| Potassium sulfate | 0.3 | Setting accelerator. |
| Alkanol B* | 0.05 | Wetting agent. |
| Water | 40.0 | Dispersing liquid. |
| Alpha calcium sulfate hemihydrate. | 100.0 | Settable inorganic. |

*Trademark of E. I. du Pont de Nemours & Co., Inc., for a sodium alkyl naphthyl sulfonate.

This slurry is coated on a 3 inch x 1 yard strip of 32 by 28 count, boiled and bleached gauze to a uniform thickness of about 0.012 inch. The strip is then dried for ten minutes at 300° F. in a Despatch laboratory forced draft oven (a product of the Despatch Oven Co., Inc.). This results in a dry bandage having a volatile moisture content of 4.5–5.5% by weight.

THE GREEN STRENGTH TEST

The 3 inch x 1 yard bandage strip is then rolled into a cylinder form and dipped into water. The wet cylinder form is then wrapped completely upon itself on a one inch diameter steel tubular core, thus forming a three inch long, hollow cylinder with a one inch inside diameter having a shell thickness of ⅛ of an inch. After a period of one hour at room temperature, the cylinder is subjected to a measured force sufficient to deform it by 25%, the force being applied against the cylindrical configuration of the cast shell at a crushing speed of one inch per minute, with a Dillon Dynamometer. The results of this test, including texture and consistency observations during cast formation, are reported in Table II.

EXAMPLE 2

The slurry composition of Example 1 is prepared in the same manner using the same proportions with the exception that 0.15 part by weight of Polyox 301 are added to the water before adding the plaster of Paris (Polyox 301 is a white granular powder form of poly(ethylene oxide) having a molecular weight of about 4,000,000). A cast is prepared and tested in the same manner as in Example 1, the results of the test being reported in Table II.

EXAMPLE 3

The slurry composition of Example 1 is prepared in the same manner using the same proportions with the exception that 0.25 part by weight of Polyox 301 are added to the water before adding the plaster of Paris. A cast is prepared and tested in the same manner as in Example 1, the results of the test being reported in Table II.

EXAMPLE 4

The slurry composition of Example 1 is prepared in the same manner using the same proportions with the exception that 0.5 part by weight of Polyox 301 are added to the water before adding the plaster of Paris. A cast is prepared and tested in the same manner as in Example 1, the results of the test being reported in Table II.

TABLE II

| Example | Quantity of Polyox 301 resin by wt. | One-hour green strength in lbs. | Texture and consistency |
|---|---|---|---|
| 1 | 0 | 80 | Thin texture; the feel of the gauze backing is evidenced. |
| 2 | 0.15 | 126 | Optimum texture and easily moldable. |
| 3 | 0.25 | 102 | Heavy texture, more difficult to mold. |
| 4 | 0.5 | 93 | Still heavier; still more difficult to mold. |

EXAMPLE 5

The slurry composition of Example 1 is prepared in the same manner using the same proportions with the exception that 0.25 part by weight of Polyox WSRN-10 are added to the water before adding the plaster of Paris (Polyox WSRN-10 is a white granular powder form of poly(ethylene oxide) having a molecular weight of approximately 100,000). A cast is prepared and tested in the same manner as in Example 1, the results of the test being reported in Table III.

EXAMPLE 6

The slurry composition of Example 1 is prepared in the same manner using the same proportions with the exception that 0.5 part by weight of Polyox WSRN-10 are added to the water before adding the plaster of Paris. A cast is prepared and tested in the same manner as in Example 1, the results of the test being reported in Table III.

EXAMPLE 7

The slurry composition of Example 1 is prepared in the same manner using the same proportions with the exception that 1.0 part by weight of Polyox WSRN-10 are added to the water before adding the plaster of Paris. A cast is prepared and tested in the same manner as in Example 1, the results of the test being reported in Table III.

EXAMPLE 8

The slurry composition of Example 1 is prepared in the same manner using the same proportions with the exception that 5.0 parts by weight of Polyox WSRN-10 are added to the water before adding the plaster of Paris. A cast is prepared and tested in the same manner as in Example 1, the results of the test being reported in Table III.

Table III summarizes the results of Examples 5 through 8 and compares these results with the conventional bandage of Example 1.

TABLE III

| Example | Quantity of Polyox WSRN-10 resin (parts by wt.) | One-hour green strength in lbs. | Texture and consistency |
|---|---|---|---|
| 1 | 0 | 80 | Thin texture; the feel of the gauze backing is evidenced. |
| 5 | 0.25 | 80 | Thin texture; the feel of the gauze backing is evidenced. |
| 6 | 0.5 | 90 | Optimum texture and easily moldable. |
| 7 | 1.0 | 110 | Heavy texture and more difficult to mold. |
| 8 | 5.0 | 90 | Heavier texture; still more difficult to mold. |

While the invention has been described with particularity with respect to specific settable compositions comprising plaster of Paris and poly(ethylene oxide) resins in a specific molecular weight range, it is to be understood that modifications may be made without departing from the invention, as will be understood by those skilled in the art.

What is claimed is:

1. A cast-forming material for making orthopedic casts of improved green strength comprising a flexible carrier coated with a composition comprising plaster of Paris and poly(ethylene oxide) present in proportions of about 0.1 to about 1.0 part by weight of poly(ethylene oxide) per 100 parts by weight of said plaster of Paris, said poly(ethylene oxide) having a molecular weight of from about 600,000 to about 4,000,000.

2. The cast-forming material of claim 1 further comprising a wet adhesive.

3. The cast-forming material of claim 2 wherein said wet adhesive is an emulsion of polyvinyl acetate.

4. A cast-forming material of claim 1 further comprising a dry adhesive.

5. The cast-forming material of claim 4 wherein said dry adhesive is corn dextrin.

6. The cast-forming material of claim 1 further comprising a setting accelerator.

7. The cast-forming material of claim 6 wherein said setting accelerator is potassium sulfate.

8. A cast-forming material for making orthopedic casts of improved green strength comprising a flexible carrier coated with a composition comprising plaster of Paris and poly(ethylene oxide) present in proportions of about 0.5 to about 5.0 parts by weight of poly(ethylene oxide) per 100 parts by weight of said plaster of Paris, said poly(ethylene oxide) having a molecular weight of from about 100,000 to about 600,000.

9. The cast-forming material of claim 8 further comprising a wet adhesive.

10. The cast-forming material of claim 9 wherein said wet adhesive is an emulsion of polyvinyl acetate.

11. A cast-forming material of claim 8 further comprising a dry adhesive.

12. The cast-forming material of claim 11 wherein said dry adhesive is corn dextrin.

13. The cast-forming material of claim 8 further comprising a setting accelerator.

14. The cast-forming materials of claim 13 wherein said setting accelerator is potassium sulfate.

15. A slurry composition for producing cast-forming materials for making orthopedic casts of improved green strength, said slurry composition comprising plaster of Paris, about 30 to about 85 parts by weight of dispersing liquid per 100 parts by weight of said plaster of Paris and about 0.1 to about 1.0 part by weight of poly(ethylene oxide) resin per 100 parts by weight of said plaster of Paris, said poly(ethylene oxide) resin having a molecular weight of about 600,000 to about 4,000,000.

16. The slurry composition of claim 15 wherein said dispersing liquid is water, said slurry composition comprising 30 to 60 parts by weight of said water per 100 parts by weight of said plaster of Paris and further comprising a hydration retarder.

17. The slurry composition of claim 16 wherein said hydration retarder comprises boric acid and ammonium hydroxide.

18. A slurry composition for producing cast-forming material for making orthopedic casts of improved green strength, said slurry composition comprising plaster of Paris, about 30 to about 85 parts by weight of dispersing liquid per 100 parts by weight of said plaster of Paris and about 0.5 to about 5 parts by weight of poly(ethylene oxide) resin per 100 parts by weight of said plaster of Paris, said poly(ethylene oxide) resin having a molecular weight of from about 100,000 to about 600,000.

19. The slurry composition of claim 18 wherein said dispersing liquid is water, said slurry composition comprising 30 to 60 parts by weight of said water per 100 parts by weight of said plaster of Paris and further comprising a hydration retarder.

20. The slurry composition of claim 19 wherein said hydration retarder comprises boric acid and ammonium hydroxide.

21. A settable composition for making orthopedic casts of improved green strength comprising plaster of Paris and poly(ethylene oxide) present in proportions of about 0.1 to about 1.0 part by weight of poly(ethylene oxide) resin per 100 parts by weight of said plaster of Paris, said poly(ethylene oxide) resin having a molecular weight of from about 600,000 to about 4,000,000.

22. A settable composition for making orthopedic casts of improved green strength comprising plaster of Paris and poly(ethylene oxide) resin present in proportions of about 0.5 to about 5.0 parts by weight of poly(ethylene oxide) resin per 100 parts by weight of said plaster of Paris, said poly(ethylene oxide) resin having a molecular weight of from about 100,000 to about 600,000.

References Cited

UNITED STATES PATENTS

| | | | |
|---|---|---|---|
| 2,557,083 | 6/1951 | Eberl | 106—111 |
| 2,842,138 | 7/1958 | Billings et al. | 106—111 |
| 2,857,288 | 10/1958 | Albrecht et al. | 106—111 |
| 3,223,082 | 12/1965 | Smith | 106—111 |
| 3,316,901 | 5/1967 | Smith | 106—111 |
| 3,502,490 | 3/1970 | Ware | 106—111 |
| 3,577,248 | 5/1971 | Doan et al. | 106—111 |

FOREIGN PATENTS

| | | | |
|---|---|---|---|
| 696,774 | 10/1964 | Canada | 260—37 AL |

OTHER REFERENCES

Polyethers, Part I, Gaylord, Interscience Pub., pp. 118, 130, 213–220, 273 are cited.

DONALD J. ARNOLD, Primary Examiner

A. H. KOECKERT, Assistant Examiner

U.S. Cl. X.R.

106—111; 128—91; 161—265; 260—17.4 ST, 29.6 S, 29.6 NR, 37 AL